US010562639B2

(12) United States Patent
Pautis et al.

(10) Patent No.: US 10,562,639 B2
(45) Date of Patent: Feb. 18, 2020

(54) AIRCRAFT ENGINE ASSEMBLY, COMPRISING AN ATTACHMENT DEVICE FOR THE ENGINE EQUIPPED WITH A STRUCTURAL COVER ATTACHED ON A CENTRAL BOX

(71) Applicant: AIRBUS OPERATIONS (S.A.S.), Toulouse (FR)

(72) Inventors: Olivier Pautis, Merville (FR); Jean-Michel Rogero, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 460 days.

(21) Appl. No.: 15/381,821

(22) Filed: Dec. 16, 2016

(65) Prior Publication Data
US 2017/0197724 A1 Jul. 13, 2017

(30) Foreign Application Priority Data

Dec. 16, 2015 (FR) ...................... 15 62540

(51) Int. Cl.
*B64C 27/26* (2006.01)
*B64D 27/26* (2006.01)
(Continued)

(52) U.S. Cl.
CPC .............. *B64D 27/26* (2013.01); *B64D 27/18* (2013.01); *B64D 29/06* (2013.01);
(Continued)

(58) Field of Classification Search
CPC ........ B64D 27/12; B64D 27/18; B64D 27/26; B64D 29/06; B64C 2027/262; B64C 2027/264; B64C 2027/268
See application file for complete search history.

(56) References Cited

U.S. PATENT DOCUMENTS 5,157,915 A * 10/1992 Bart ...................... B64D 27/18
244/54
5,226,288 A 7/1993 Cornax
(Continued)

FOREIGN PATENT DOCUMENTS

EP 1789320 B1 6/2008
EP 1883578 B1 8/2012
(Continued)

OTHER PUBLICATIONS

French Search Report for Application No. 1562540 dated Sep. 7, 2016.

*Primary Examiner* — Richard R. Green
*Assistant Examiner* — Michael A. Fabula
(74) *Attorney, Agent, or Firm* — Jenkins, Wilson, Taylor & Hunt, P.A.

(57) ABSTRACT

In order to reduce congestion of attachments between an aircraft engine and its attachments, an engine assembly is provided, the primary structure of the device of which includes a structural cover surrounding the engine and connected on a central box, the cover including an outer skin interiorly delimiting a secondary flow. A group of main mounts is provided as a group of secondary mounts laid out at the rear of the group of main mounts, the group of main mounts including a plurality of bolts distributed around the longitudinal axis of the engine and ensuring the attachment of a front end of the cover to the hub of the intermediate case, and a group of secondary mounts including a plurality of secondary mounts distributed around the axis and ensuring attachment of a rear portion of the engine to a rear end of the cover.

16 Claims, 7 Drawing Sheets

(51) Int. Cl.
  *B64D 27/18* (2006.01)
  *B64D 29/06* (2006.01)
  *F02C 7/20* (2006.01)

(52) U.S. Cl.
  CPC .. *B64D 2027/264* (2013.01); *B64D 2027/268* (2013.01); *F02C 7/20* (2013.01)

(56) References Cited

U.S. PATENT DOCUMENTS

| | | | | |
|---|---|---|---|---|
| 5,603,471 | A * | 2/1997 | Armstrong | B64D 29/00 239/265.31 |
| 5,941,061 | A * | 8/1999 | Sherry | B64D 29/08 244/54 |
| 6,340,135 | B1 * | 1/2002 | Barton | B64D 29/00 244/53 B |
| 7,740,200 | B2 | 6/2010 | Diochon et al. | |
| 7,784,733 | B2 | 8/2010 | Diochon et al. | |
| 7,971,825 | B2 | 7/2011 | Diochon et al. | |
| 8,523,516 | B2 | 9/2013 | Vauchel et al. | |
| 8,739,552 | B2 | 6/2014 | Fauchel et al. | |
| 8,740,137 | B2 * | 6/2014 | Vauchel | B64D 29/08 244/53 B |
| 9,783,315 | B2 * | 10/2017 | James | B64D 29/08 |
| 2010/0084507 | A1 * | 4/2010 | Vauchel | B64D 29/08 244/1 N |
| 2010/0252689 | A1 * | 10/2010 | Vauchel | B64D 29/06 244/53 B |
| 2015/0166192 | A1 | 6/2015 | Ewens et al. | |
| 2016/0244174 | A1 | 8/2016 | Pautis | |

FOREIGN PATENT DOCUMENTS

| | | |
|---|---|---|
| FR | 2903076 A1 | 1/2008 |
| FR | 2907098 A1 | 4/2008 |
| FR | 3 014 841 A1 | 6/2015 |
| WO | WO 2006/090031 A1 | 8/2006 |
| WO | WO 2008/043903 A2 | 4/2008 |
| WO | WO 2012/085388 A1 | 6/2012 |
| WO | WO 2015/067891 A2 | 5/2015 |

* cited by examiner

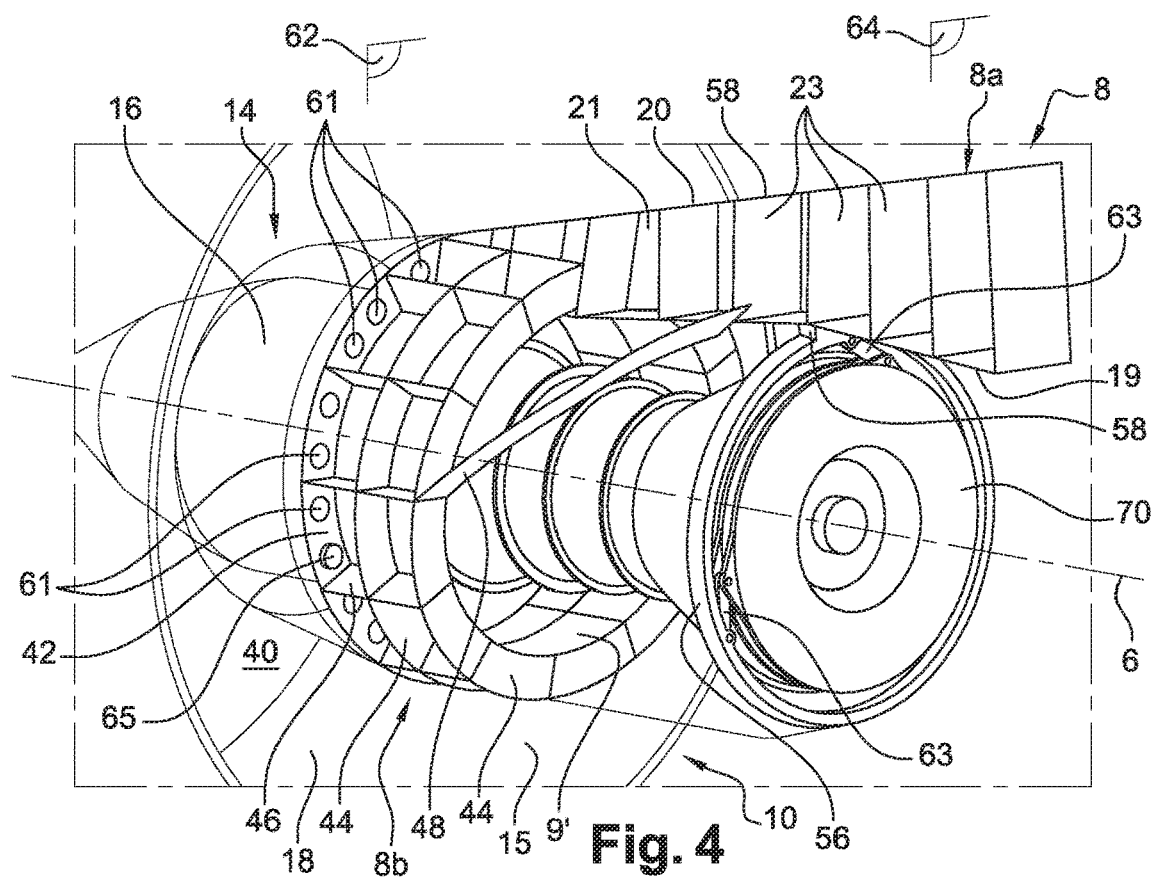
Fig. 4
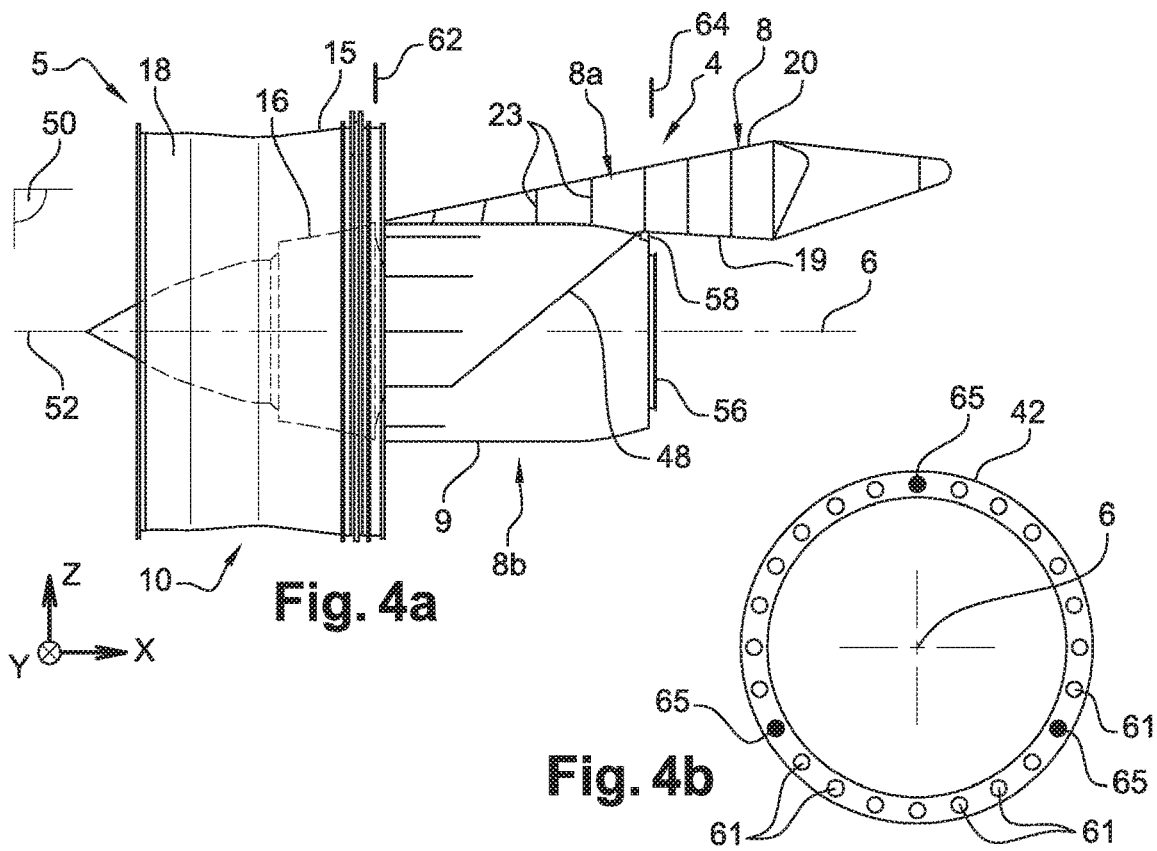
Fig. 4a
Fig. 4b

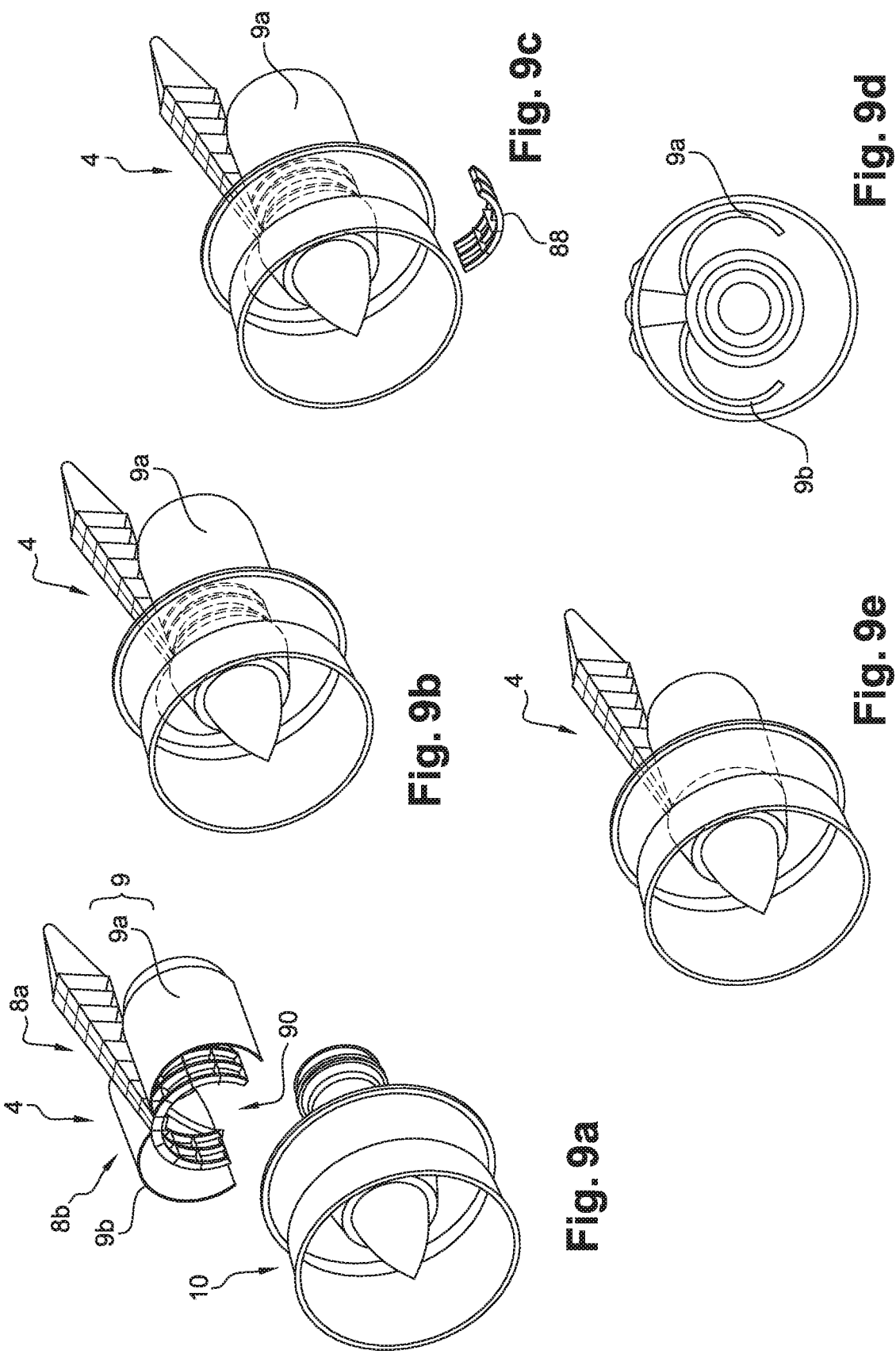

AIRCRAFT ENGINE ASSEMBLY, COMPRISING AN ATTACHMENT DEVICE FOR THE ENGINE EQUIPPED WITH A STRUCTURAL COVER ATTACHED ON A CENTRAL BOX

CROSS-REFERENCE TO RELATED APPLICATION

This application claims priority to French Patent Application FR 15 62540 filed Dec. 16, 2015, the entire disclosure of which is incorporated by reference herein.

TECHNICAL FIELD

The present disclosure relates to the field of aircraft engine assemblies comprising a device for attaching the engine to a structure of the aircraft, preferably under a wing of this aircraft. It applies preferentially, but is not limited, to commercial airplanes.

BACKGROUND

On existing aircraft, the engines such as double-flow and double-body turbojet engines are suspended below the wings by complex attachment devices, also called "EMS" (Engine Mounting Structure), or even attachment strut. The attachment struts usually employed have a rigid structure, called primary structure. This primary structure generally forms a box section, that is to say that it is constructed by the assembly of bottom and top longerons connected together by a plurality of transverse stiffening ribs, situated inside the box section. The longerons are arranged as bottom and top faces, while lateral panels close the box section as lateral faces.

As is known, the primary structure of these attachment devices is designed to allow the transmission to the wings of the static and dynamic loads generated by the engines, such as the weight, the thrust, or even the different dynamic loads.

In the solutions known from the prior art, the transmission of the loads between the engine and the primary structure is conventionally ensured by attachments consisting of a front engine mount, a rear engine mount and a thrust load take-up device. Together, these elements form an isostatic system of mounts.

Usually, the front engine mount is fixed to the outer shell of an intermediate casing or to the fan casing, as is disclosed in the document FR 3 014 841. Alternatively, this front engine mount can be added to the hub of the intermediate casing, linked by radial arms to the abovementioned outer shell. For its part, the rear engine mount links the primary structure to the exhaust casing of the engine, situated at the rear end of this engine.

With this type of configuration, loads of high intensity have to be taken up by the rear engine mount, notably the loads linked to the torque. To ensure the take-up of these significant loads, the rear engine mount usually has a significant bulk, particularly in the transverse direction. This strong bulk can for example be reflected by the presence of local protrusions at the two lateral ends of the rear engine mount. This causes, in the secondary jet, aerodynamic disturbances which are detrimental to the overall efficiency of the engine. Furthermore, there devolves therefrom an overdimensioning of the surrounding aerodynamic fairings, such as for the rear aerodynamic fairing (or APF, "Aft Pylon Fairing"), the width of which has to be adapted accordingly. These overdimensionings of the surrounding fairings also cause drag.

Moreover, the take-up of the loads at two points off-center from the longitudinal axis of the engine, respectively by the front engine mount and the rear engine mount, provokes a flexural deformation of the engine. This deformation leads to the wear of the blades of the high and low pressure turbines, and/or to the provision of significant gaps at blade end to limit their wear. In all cases, there devolves therefrom a loss of efficiency of the engine.

SUMMARY

An aim of the disclosure herein is therefore to propose an aircraft engine assembly that at least partially remedies the abovementioned problems, encountered in the prior art solutions.

For this, the subject of the disclosure herein is an aircraft engine assembly comprising:
- a double-flow engine comprising an intermediate casing comprising a hub, an outer shell and radial arms linking the hub to the outer shell;
- an attachment device for attaching the engine to a structure of the aircraft, the attachment device comprising a primary structure equipped with a central box section;
- attachment(s) for attaching the engine to the primary structure of the attachment strut.

According to the disclosure herein, the primary structure also comprises a structural cover surrounding the engine and having an overall annular form centered on a longitudinal axis of the engine, the structural cover being connected to the central box section and comprising an outer skin internally delimiting a secondary jet of the engine, and the attachments define a group of main mounts and a group of secondary mounts arranged at the rear of the group of main mounts, the group of main mounts comprising a plurality of bolts distributed around the longitudinal axis of the engine and ensuring the fastening of a front end of the structural cover to the hub of the intermediate casing, and the group of secondary mounts comprising a plurality of secondary mounts distributed around the longitudinal axis of the engine and ensuring the fastening of a rear part of the engine to a rear end of the structural cover.

The disclosure herein is noteworthy in that it provides main mounts in the form of bolts distributed all around the longitudinal axis of the engine, between the structural cover and the hub of the intermediate casing. Most of the loads originating from the engine are thus taken up hyperstatically by these main mounts, as close as possible to the center of gravity of the engine. Consequently, the secondary mounts situated rearmost are largely unburdened by taking up only the inertial loading of the center casing. Because of this, they can have a smaller bulk than in the prior art. By virtue of this bulk reduction, the secondary air flow is less disturbed in the secondary jet, which improves the overall performance levels of the engine. The surrounding aerodynamic fairings can also have a reduced bulk, with a reduction of the drag and of their weight as positive consequence.

The disclosure herein moreover provides for incorporating, in the primary structure, the outer skin internally delimiting the secondary jet of the engine. This skin, usually called IFS ("Inner Fixed Structure" or even "Inner Fan Structure"), is therefore shrewdly incorporated in the primary structure to fulfill therein a working skin function, by virtue of which it is no longer necessary to implement lateral connecting rods for taking up the thrust loads as encountered in the prior art.

Finally, by shrewdly providing main and secondary mounts all around the longitudinal axis of the engine, the flexural deformations of the engine are greatly reduced. The ends of the turbine blades can thus be reduced, to obtain improved efficiency.

The disclosure herein can also have at least one of the following additional features, taken in isolation or in combination.

The structural cover comprises a substantially annular front frame, forming the front end of the structural cover and substantially centered on the longitudinal axis of the engine, the substantially annular front frame being fastened to a front end of the central box section of the primary structure.

The structural cover comprises one or more other additional substantially annular frames, of which the two facing ends are fastened respectively on either side of the central box section of the primary structure, the front frame and the additional frame/frames being parallel, arranged in hypothetical transverse planes of the engine, and preferably fixedly linked together by longitudinal reinforcements distributed around the longitudinal axis of the engine.

The structural cover comprises two thrust load take-up cradles arranged symmetrically relative to a median vertical plane of the engine assembly, each cradle having a front end fastened to the rearmost additional frame, and a rear end fastened to the central box section of the primary structure.

The front ends of the thrust load take-up cradles are arranged in a median horizontal plane of the structural cover. Alternatively, these front ends could be arranged in a horizontal plane situated lower than the median horizontal plane of the engine, without departing from the scope of the engine.

The attachments also comprise a plurality of centering/shearing pins arranged between the front end of the structural cover and the hub of the intermediate casing. There are preferably three of these pins, distributed at 120°.

The structural cover comprises a substantially annular rear frame, forming the rear end of the structural cover and substantially centered on the longitudinal axis of the engine, the substantially annular rear frame being fastened to the central box section of the primary structure, forward relative to a rear end of this central box section.

The substantially annular rear frame is fastened to a bottom longeron of the central box section of the primary structure.

The substantially annular rear frame is situated rearward relative to the rear ends of the thrust load take-up cradles, but all these elements could be arranged in a single and common plane without departing from the scope of the disclosure herein.

The outer skin of the structural cover covers the substantially annular front frame, the substantially annular additional frame/frames, and the substantially annular rear frame.

According to a first preferred embodiment, the outer skin has a substantially annular form, and it is fastened to each of the elements out of the substantially annular front frame, the substantially annular additional frame/frames, and the substantially annular rear frame.

The outer skin has two facing ends fastened respectively on either side of the central box section of the primary structure, preferably by splicing.

According to a second preferred embodiment, the outer skin takes the form of two mobile hoods each articulated on the central box section of the primary structure, each mobile hood having a front end cooperating with the front frame so as to form therewith, in the closed position of the hood, a mechanical link comprising a protuberance of trapezoidal section and a groove of complementary form receiving the protuberance, and each mobile hood also has a rear end cooperating with the rear frame so as to form therewith, in the closed position of the hood, a mechanical link comprising a protuberance of trapezoidal section and a groove of complementary form receiving the protuberance. The aim of this embodiment is notably to have the hoods work in particular under the loadings/flexural stresses of the central casing, and thus limit the deformation thereof under loading.

The plurality of secondary mounts are each produced using a connecting rod on the one hand articulated on a fitting of the structural cover, and on the other hand articulated on a fitting of the engine, the connecting rods being arranged substantially tangentially to the engine.

The connecting rods forming the plurality of secondary mounts are arranged in one and the same hypothetical transverse plane of the engine.

Another subject of the disclosure herein is an aircraft comprising at least one such engine assembly, preferably fastened under a wing of this aircraft.

Other advantages and features of the disclosure herein will become apparent from the nonlimiting detailed description hereinbelow.

BRIEF DESCRIPTION OF THE DRAWINGS

This description will be made in light of the attached drawings in which:

FIG. 4 represents a perspective view of the engine assembly according to the first embodiment, incorporating the attachment device shown in FIGS. 2 and 3;

FIG. 4a represents a side view of the engine assembly shown in the preceding figure;

FIG. 4b is a schematic side view representing interleaving between the centering pins and the main mounts;

FIGS. 9a through 9e are perspective schematic views representing a first way of assembling the engine on the attachment device;

DETAILED DESCRIPTION

Figure 11:
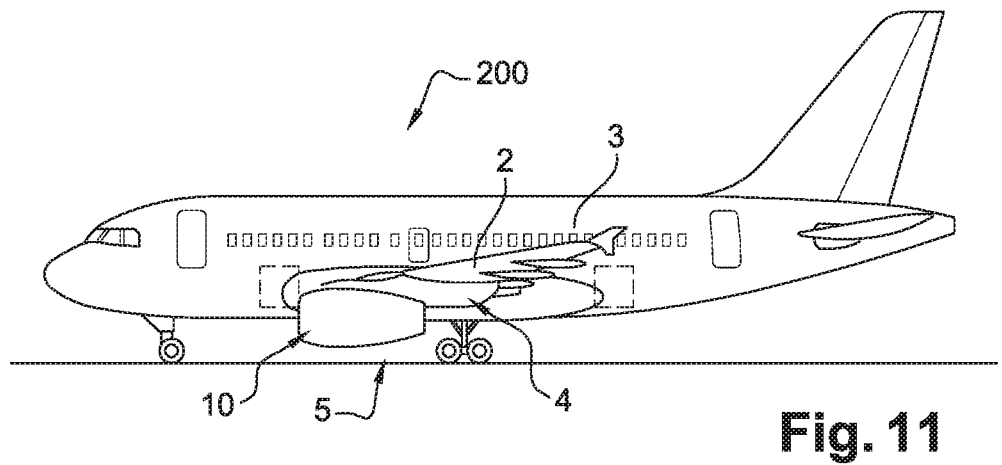
FIG. 11 represents a side view of an aircraft comprising several engine assemblies such as those shown in the preceding figures.

Referring to FIG. 11, an aircraft 200 is represented comprising a fuselage 3 to which are fastened two wing elements 2 (only one visible in FIG. 11), each wing element bearing an engine assembly 5 according to the disclosure herein. This engine assembly 5 comprises a double-flow and dual-body engine 10, such as a turbojet engine, and an attachment device 4 for the engine 10, also called attachment strut. Conventionally, the engine assembly 5 is suspended under its wing 2.

Figure 1:
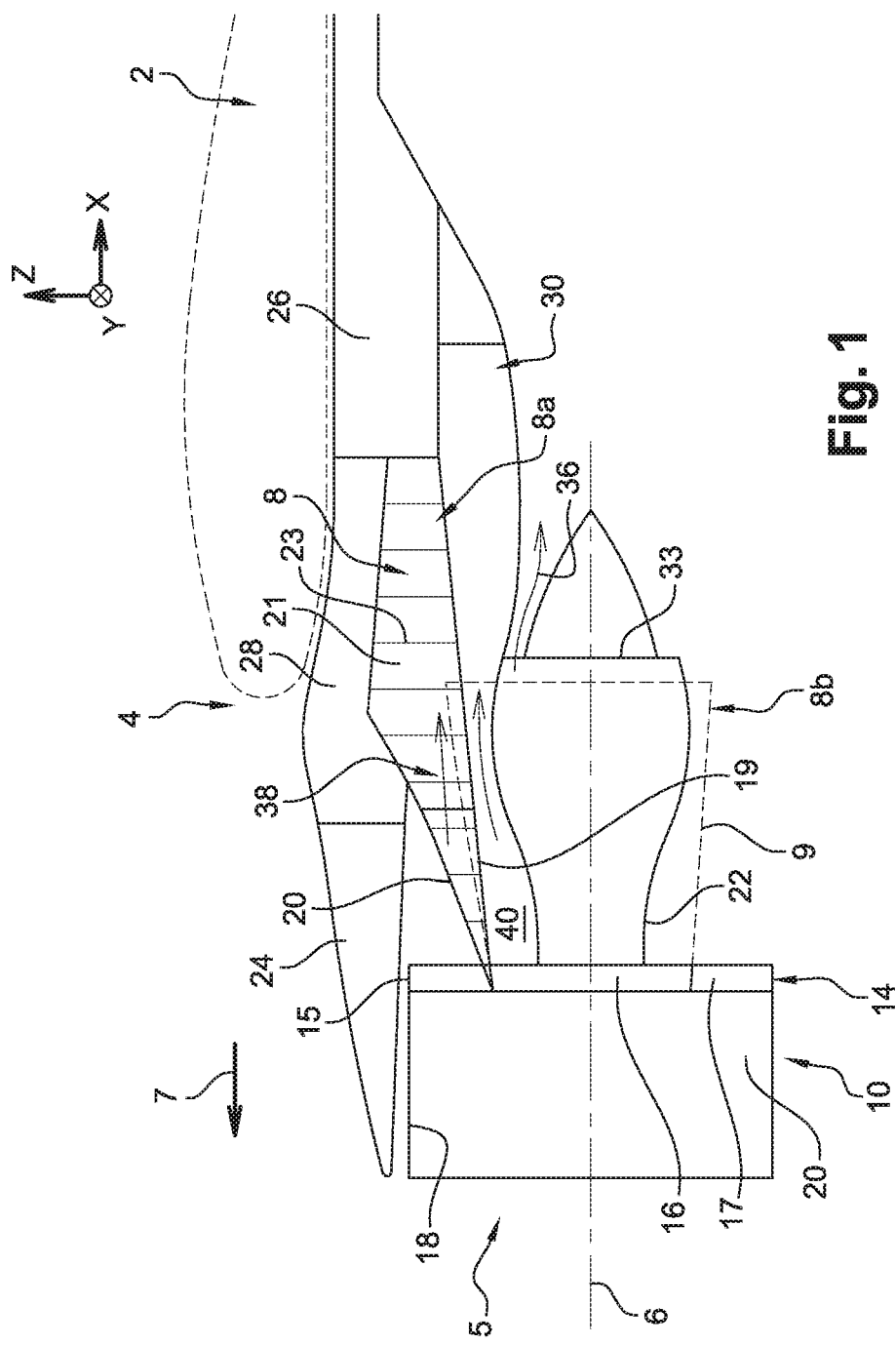
FIG. 1 represents a schematic side view of an engine assembly according to the disclosure herein.
Figure 2:
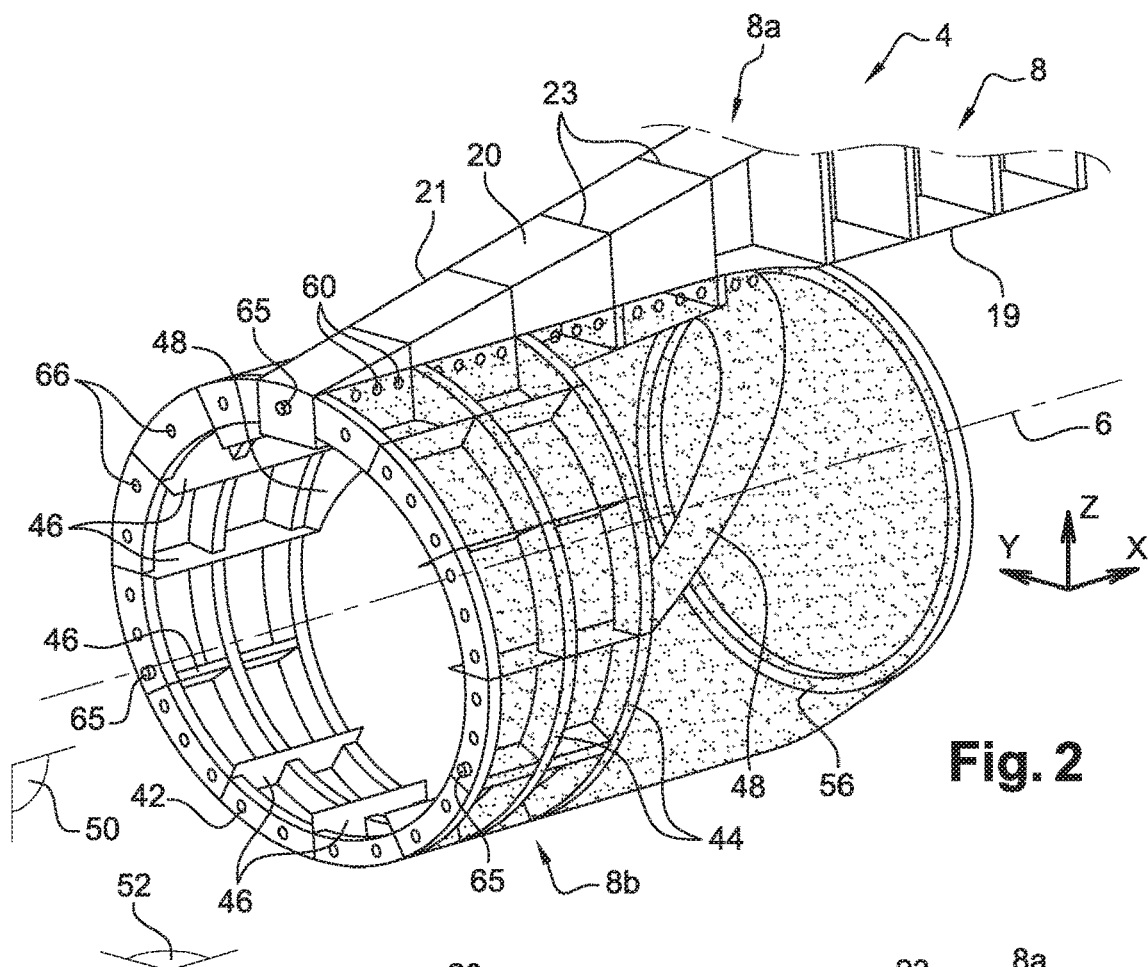
FIG. 2 represents a perspective view of the attachment device of the engine with which the assembly shown in the preceding figure is equipped, the attachment device taking the form of a first preferred embodiment of the disclosure herein.

Referring to FIG. 1, one of the engine assemblies 5 fastened under its wing 2 is represented. The assembly 5 is intended to be surrounded by a nacelle (not represented), and the attachment device 4 comprises a series of mounts (not represented) added to the rigid structure 8 and making it possible to ensure the suspension of this assembly 5 under the wing 2 of the aircraft.

Throughout the following description, by convention, the direction X corresponds to the longitudinal direction of the device 4 which can also be likened to the longitudinal direction of the turbojet engine 10 and to that of the engine assembly 5, this direction X being parallel to a longitudinal axis 6 of this turbojet engine 10. Also the direction Y corresponds to the direction oriented transversely relative to the device 4 and can also be likened to the transverse direction of the turbojet engine and to that of the engine assembly 5, and the direction Z corresponds to the vertical direction or the heightwise direction, these three directions X, Y and Z being mutually orthogonal.

Also, the terms "front" and "rear" are to be considered relative to a direction of advance of the aircraft encountered as a result of the thrust exerted by the turbojet engines 10, this direction being schematically represented by the arrow 7.

FIG. 1 shows the rigid structure 8 of the attachment device 4, and a plurality of secondary structures added to the rigid structure 8. These secondary structures ensuring the segregation and the securing of the systems while supporting aerodynamic fairing elements will be briefly described hereinbelow.

The turbojet engine 10 has, at the front, a fan casing 18 of large dimension, delimiting an annular fan channel. It comprises, toward the rear, a central casing 22 of smaller dimension, enclosing the core of this turbojet engine. The casings 18 and 22 are secured to one another, via an intermediate casing 14. The latter comprises an outer shell 15 which is situated in the rear extension of the fan casing 18. This intermediate casing 14 also comprises a hub 16, and radial arms 17 linking the hub 16 to the outer shell 15. By way of indication, it is specified that the hub 16 is also called "inner shell" of the intermediate casing 14.

The rigid structure 8 of the attachment device 4 adopts a form specific to the present disclosure. It comprises, first of all, a central box section 8a extending from the rear to the front, substantially in the direction X. The central box section 8a then takes the form of a strut of design similar to that usually observed for the turbojet engine attachment struts, notably in as much as it is provided with transverse stiffening ribs 23 each taking the form of a rectangle oriented in a plane YZ. Around these ribs 23, the central box section conventionally comprises a bottom longeron 19, a top longeron 20 and two lateral panels 21 (only one visible in FIG. 1). Each of these elements 19, 20, 21 can be produced in a single piece, or else using elements added to one another.

One of the particular features of the disclosure herein lies in the fact that the rigid structure 8 also comprises a structural cover 8b centered on the longitudinal axis 6 of the turbojet engine 10, this cover 8b being of overall annular form and fixedly connected to the central box section 8a. The structural cover 8b, extending only along a front part of the central box section 8a, comprises an outer skin 9 internally delimiting the secondary annular jet 40 of the turbojet engine 10. This skin 9, also known by the name IFS ("Inner Fixed Structure"), is thus shrewdly made to work to contribute to the transmission of the loads from the engine to the wing.

The structural cover 8b thus takes the general form of a barrel or a cylinder. It is the element provided to bear the attachments for attaching the turbojet engine 10 to the primary structure 8, as will be detailed hereinbelow with reference to the following figures.

Still referring to FIG. 1, the attachment device 4 comprises several secondary structures, including a front aerodynamic structure 24, a rear aerodynamic structure 26, a connecting fairing 28 for the front and rear aerodynamic structures, and a rear aerodynamic fairing 30, called bottom rear aerodynamic fairing, or even primary flow aerodynamic fairing.

Overall, these secondary structures are conventional elements of forms identical or similar to those encountered in the prior art, and known to those skilled in the art. The dimensioning of some of these fairings can nevertheless be reduced by virtue of the particular design of the attachments and of the rigid structure, notably the rear aerodynamic fairing 30, the width of which in the direction Y can be reduced.

More specifically, the front aerodynamic structure 24 is placed in the bottom front extension of the wing 2, above the primary structure 8. It is fixedly mounted on to the central box section 8a, and has an aerodynamic profile function between a top part of the fan hoods articulated on this box section, and the leading edge of the wing. This front aerodynamic structure 24 then has not only an aerodynamic fairing function, but also makes it possible to put in place, segregate and route different systems (air, electrics, hydraulics, fuel).

Directly in the rear extension of this structure 24, still under the wing and mounted above the rigid structure 8, there is the connecting fairing 28, also called "karman". Then, still toward the rear, the connecting fairing 28 is extended by the rear aerodynamic structure 26, which contains some of the equipment items of the strut. This structure 26 is preferably situated entirely rearward relative to the rigid structure 8, and is therefore attached under the wing of the aircraft.

Finally, under the rigid structure 8 and the rear aerodynamic structure 26, there is the rear aerodynamic fairing 30, also called "shield" or "aft pylon fairing". Its main functions are on the one hand to form a thermal fire prevention barrier used to protect the attachment device and the wings from the heat given off by the primary flow 36 escaping from the jet nozzle 33, and on the other hand to form an aerodynamic continuity between the output of the engine and the attachment device.

Laterally, the rear aerodynamic fairing 30 is closely followed by the secondary flow 38 from the secondary jet 40, also called secondary annular channel and located in the extension of the fan annular channel.

FIGS. 2 through 4b show the rigid structure 8 of the attachment device, according to a first preferred embodiment of the disclosure herein.

As indicated previously, the device 4 comprises the central box section 8a and the structural cover 8b in barrel or cylinder form centered on the axis 6. This cover 8b comprises, first of all, a substantially annular front frame 42, arranged in a hypothetical transverse plane YZ. It is the web of this frame 42 which is located arranged in the above-mentioned hypothetical plane, it nevertheless being specified that this frame 42 can have a cap strip widened at its periphery in order to support the working outer skin 9. The front frame 42 forms the annular front end of the structural cover 8b. It is fastened to a front end of the central box section 8a, by being, for example, combined with a front closing rib of this box section.

Spaced apart and arranged toward the rear of the front frame 42, the structural cover 8b also comprises one or more other substantially annular additional frames 44, of which two are provided here. This (these) additional frame(s) 44 are of a design identical or similar to that of the front frame 42. They nevertheless each extend over an annular segment slightly less than 360°, because their two facing ends are respectively fastened on either side of the central box section 8a, to the lateral panels 21. This fastening is preferably done in the transverse continuity of one of the transverse stiffening ribs 23, the latter even being able to be produced of a single piece with its associated additional frame 44.

The additional frames 44 can be parallel to one another and parallel to the front frame 42, or else slightly inclined toward the rear (between 0 and 45°). They are also preferably arranged in hypothetical transverse planes of the engine. The frames 42, 44 are thus linked together in the top part, by the central box section 8a. However, to consolidate the mechanical link between these frames, longitudinal reinforcements 46 are provided, distributed around the longitudinal axis 6. By way of indication, ten or so longitudinal reinforcements 46 can follow one another in the circumferential direction, each reinforcement linking the three frames 42, 44 together.

Possibly, an inner skin 9' can be fastened to the inner radial end of the frames 42, 44, as can be seen in FIG. 4. These frames can then have a widened shroud for the support and fastening of the inner skin 9'.

Toward the rear of this boxed assembly, the structural cover 8b comprises two thrust load take-up cradles 48. They are arranged symmetrically relative to a median vertical plane 50 of the engine assembly and of the attachment device 4. Each cradle 48 has a front end fastened to the rearmost additional frame 44, these front ends being arranged in a median horizontal plane 52 of the structural cover 8b. Alternatively, these front ends could be arranged in a horizontal plane situated lower than the median plane 52. Each cradle 48 also comprises a rear end fastened to the central box section 8a, in the rear part of the structural cover 8b. Consequently, the cradles 48 are inclined relative to the direction X, because they extend upward in a rearward direction.

Finally, the structural cover 8b comprises a substantially annular rear frame 56, also centered on the axis 6 and forming the rear end of the structural cover. It extends over 360° and has, in the top part, a material link 58 with the central box section 8a, allowing the fastening of the rear frame 56 to the bottom longeron 19 of the central box section 8a. This material link 58, situated under the central box section 8a, can be produced in a single piece with one of the transverse internal ribs 23 arranged in the vertical continuity of the rear frame 56, and/or produced of a single piece with this same frame 56.

The rear frame 56 thus forms the rear end of the structural cover 8b, by being added in front relative to a rear end of the central box section 8a. As can be seen in FIG. 4a, the connection of the rear frame 56 is made in a substantially central zone of the box section 8a.

Furthermore, the rear frame 56 is situated rearward relative to the rear ends of the thrust load take-up cradles 48, which are fastened to the lateral panels 21. Nevertheless, these rear ends of the cradles 48 can be situated in very close axial proximity to the rear frame 56, as can be seen for example in FIG. 2.

The working outer skin 9 therefore extends in a substantially annular manner along the structural cover 8b, by covering the frames 42, 44, 56. In this first preferred embodiment, the skin 9 is fastened to the cap strip of each of the frames 42, 44, 56, for example by riveting, bolting or any other similar technique, as is represented schematically by circles 60 in FIG. 2. Furthermore, the outer skin 9 extends over an angular segment slightly less than 360°, because its two facing circumferential ends are fastened respectively on either side of the central box section 8a, to the lateral panels 21. This fastening is preferably done by splicing.

Another particular feature of the disclosure herein lies in the design of the attachments for attaching the turbojet engine 10 to the rigid structure 8, these attachments being specially adapted to the structural cover 8b.

In effect, these attachments define or comprise a group of main mounts 61 situated in a first hypothetical transverse plane 62, and a group of secondary mounts 63 situated in a second hypothetical transverse plane 64, arranged behind the first plane 62.

The group of main mounts comprises a plurality of axial bolts 61 distributed around the longitudinal axis 6, and ensuring the fastening of the front frame 42 to the hub 16 of the intermediate casing 14.

These bolts 61, visible in FIG. 4, are therefore distributed to 360° along the circumferential direction of the front frame 42. These bolts are, for example, provided in a number greater than or equal to 5 for each 90° angular segment. They pass through orifices 66 formed on the front frame 42, and orifices (not represented) of the intermediate casing 14.

Figure 3:
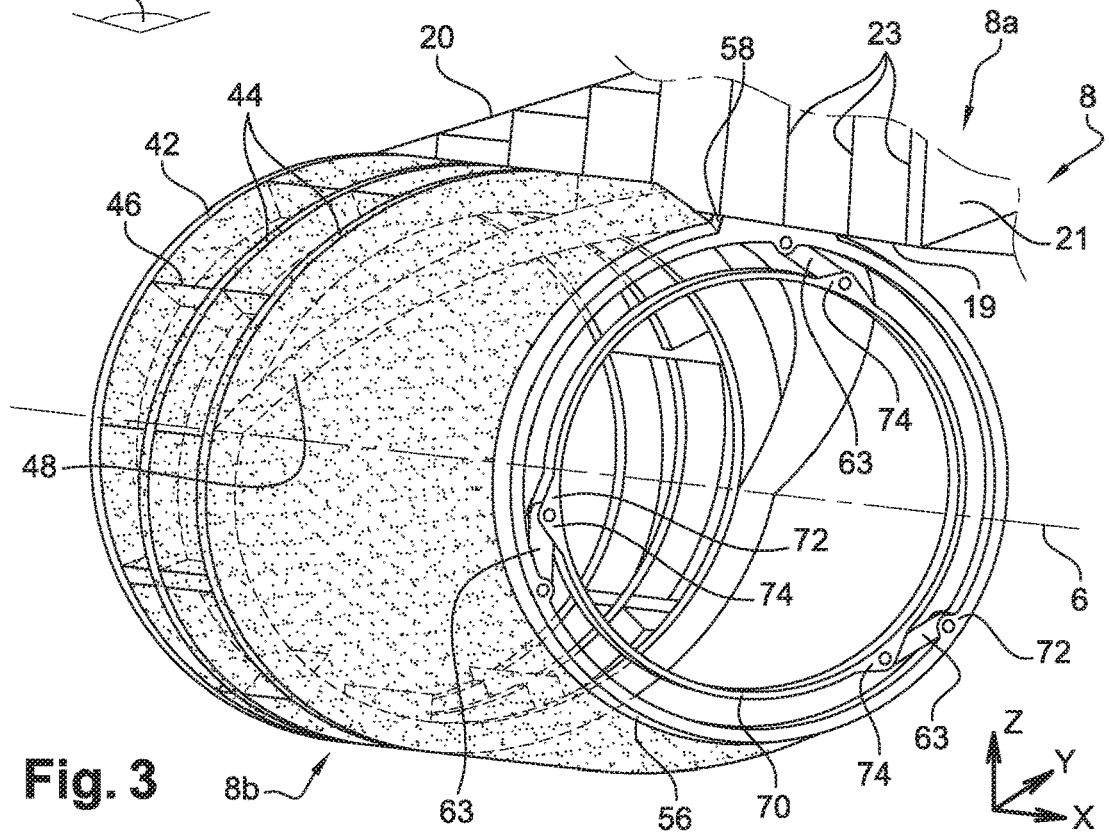
FIG. 3 represents a perspective view of the attachment device, from a second viewing angle.

Furthermore, the group of secondary mounts comprises a plurality of secondary mounts 63, also distributed around the longitudinal axis 6. A smaller number of these mounts are provided, for example three mounts 63 distributed at 120°. They ensure the fastening of an exhaust casing 70 of the turbojet engine 10, on to the rear frame 56. They are each produced using a connecting rod 63 on the one hand articulated on a fitting 72 of the rear frame 56, and on the other hand articulated on a fitting 74 of the exhaust casing 70, as can be seen in FIG. 3. The connecting rods 63, arranged in the same hypothetical transverse plane 64, are arranged substantially tangentially to the exhaust casing 70 of the turbojet engine 10.

Finally, the attachments also comprise several centering pins 65, preferably three pins distributed at 120° around the axis 6, and extending in the direction X. These centering pins 65 are arranged in the first hypothetical transverse plane 62, and interleaved in the annular row of bolts 61 as can be seen in FIGS. 4 and 4b. They are fixedly borne by the front frame 42, and housed in corresponding orifices (not represented) provided in the hub 16 of the intermediate casing. A reverse arrangement could naturally be provided, without departing from the scope of the disclosure herein. These pins 65 are used first of all for the correct positioning of the engine with respect to the rigid structure, during the engine mounting/dismantling phases. They are also used partly to take up shear loads in the plane YZ, and to take up loads associated with the torque in the direction X.

By virtue of the arrangement and of the design of the main mounts 61 and secondary mounts 63, most of the loads are taken up hyperstatically by the main mounts 61 situated closest to the center of gravity of the turbojet engine. The secondary mounts 63 are then used mainly, even exclusively, to take up the internal deformation loads of the central casing 22 of the turbojet engine 10. That makes it possible to reduce their number and their dimensioning, and also reduce the dimensioning of the material link 58 protruding radially from the working outer skin 9. The material link can thus have a transverse width that is less than or equal to that of the central box section 8a in line with the rear frame 56, in order to best limit the disturbances of the secondary flow.

Figure 5:
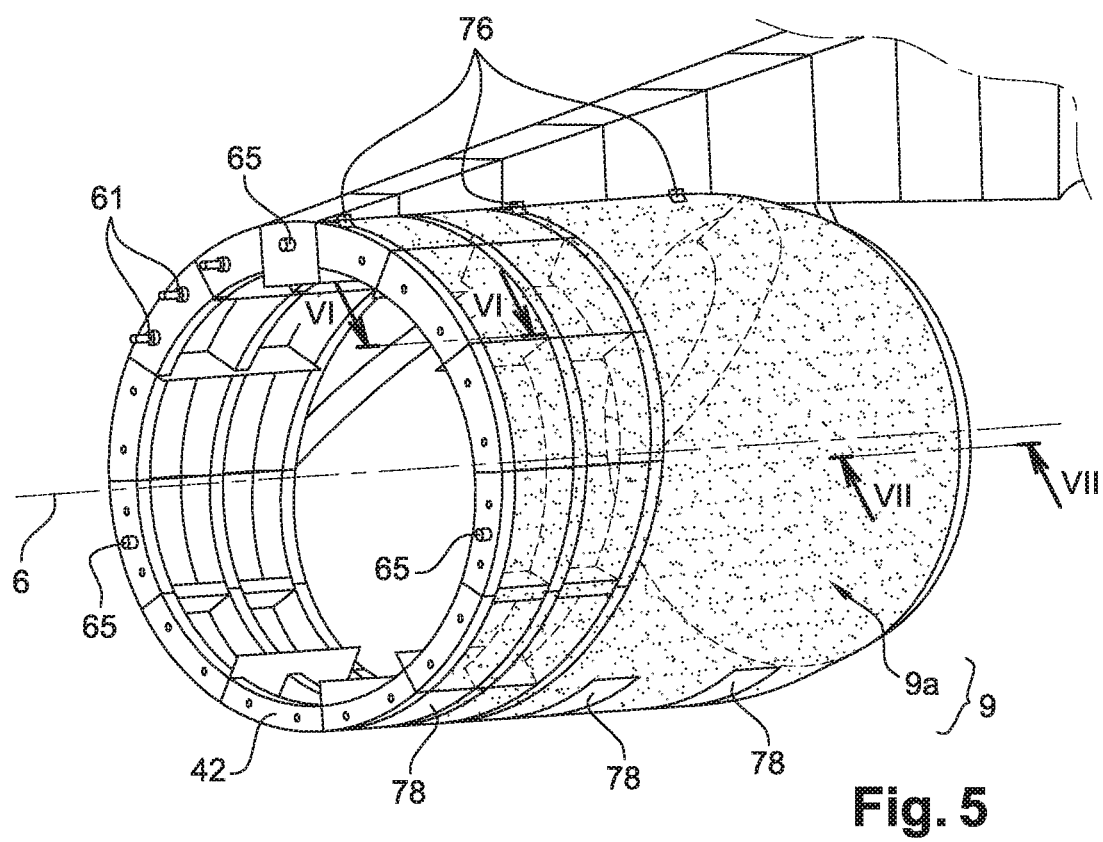
FIG. 5 represents a perspective view of an attachment device according to a second preferred embodiment of the disclosure herein.
Figure 5A:
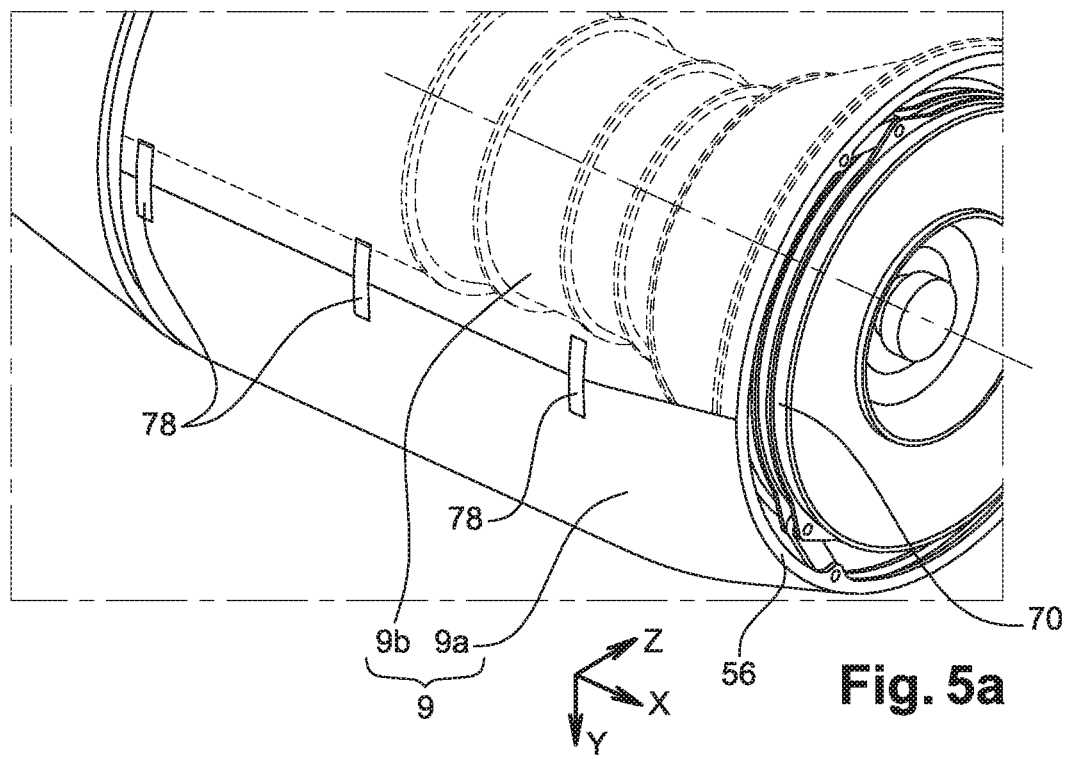
FIG. 5a represents a perspective view of a part of the engine assembly shown in the preceding figure, from a different viewing angle.
Figure 6:
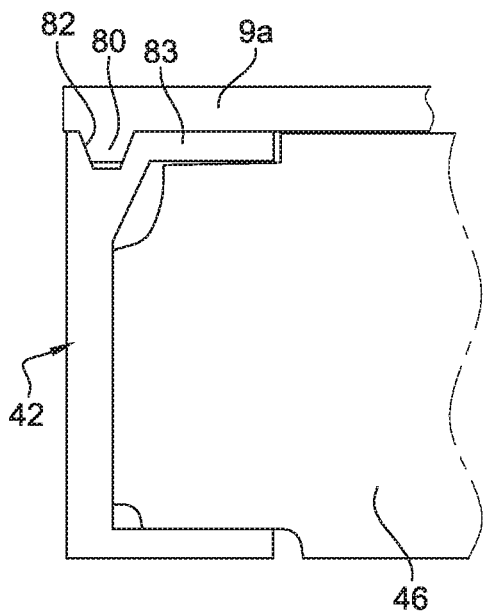
FIG. 6 represents a cross-sectional view taken along the line VI-VI of FIG. 5.
Figure 7:
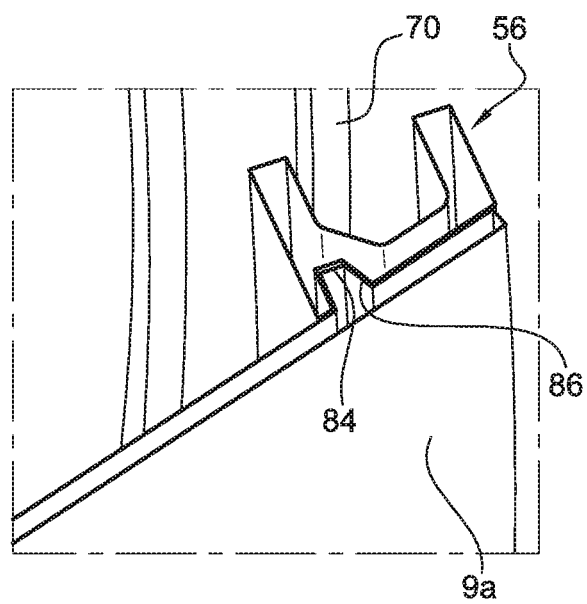
FIG. 7 represents a cross-sectional view taken along the line VII-VII of FIG. 5.

In the second preferred embodiment represented in FIGS. 5 through 7, the attachment device differs from the preceding embodiment in that the working outer skin 9 is no longer fastened to the four frames 42, 44, 56, but it takes the form of two mobile hoods 9a, 9b.

Each mobile hood 9a, 9b is articulated on the central box section 8a, using hinges 76 spaced apart in the direction X. Each mobile hood 9a, 9b therefore extends over substantially 180° by being articulated at its top end, on one of the lateral panels 21 of the central box section 8a. At their facing bottom ends, the two hoods 9a, 9b are locked to one another by locking devices 78, of conventional design. The mobile nature of these hoods 9a, 9b makes it possible to simplify the access to the turbojet engine and to its equipment items, during maintenance operations.

To make the outer skin 9 working, each of the hoods 9a, 9b which make up this skin has a front end cooperating with the front frame 42 so as to form therewith, in the closed position of the hood, a mechanical link. As represented in FIG. 6, this mechanical link preferably comprises a protuberance 80 of trapezoidal section provided on the hood 9a, 9b, and a groove 82 of complementary form provided on the rear frame 42, at the level of its cap strip 83 supporting the hood.

Similarly, each of the hoods 9a, 9b has a rear end cooperating with the rear frame 56 so as to form therewith, in the closed position of the hood, a mechanical link. As represented in FIG. 7, this mechanical link preferably comprises a protuberance 84 of trapezoidal section provided on the hood 9a, 9b, and a groove 86 of complementary form provided on the rear frame 56, here of U-shaped section, the base of which serves as the support for the hood 9a, 9b.

By virtue of the combining of these two mechanical links at the opposite axial ends of the hoods, the skin 9 can thus have a working function, being used to transfer a portion of the loads toward the central box section 8a.

Whatever the embodiment envisaged, the attachment device 4 allows several techniques for assembling the turbojet engine 10 on this device 4.

Figure 8:
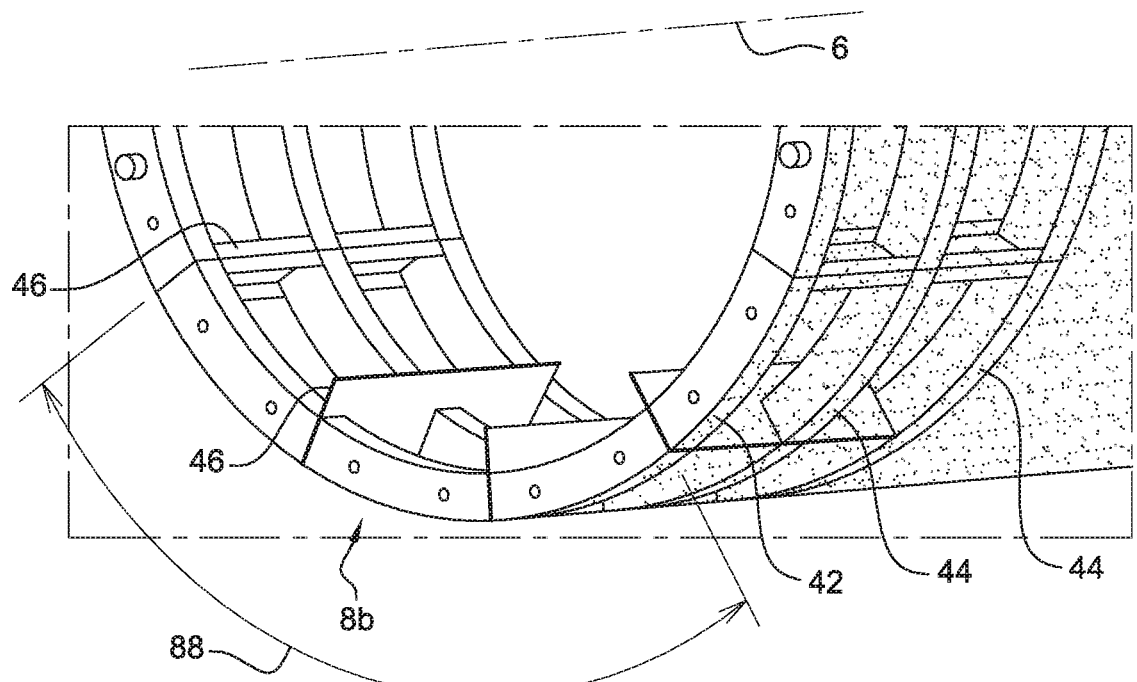
FIG. 8 is an enlarged perspective view of a part of the attachment device shown in FIG. 2.

For the implementation of a first technique, the structural cover 8b shown in FIG. 8 has frames 42, 44 segmented so as to be able to dismantle then remount an angular segment 88 of each of them. This angular segment 88, centered at 6 o'clock in a clock reference frame, extends for example over substantially 90°. The assembly of this segment 88 on the rest of the cover 8b is preferably performed at the level of the longitudinal reinforcements 46. At the interfaces, these reinforcements 46 are doubled and assembled by splicing, to allow for easy mounting and dismantling.

FIGS. 9a through 9e represent different steps of assembly for the implementation of this first technique. First of all, as shown in FIG. 9a, the abovementioned angular segment is removed, which provides a bottom opening 90 in the structural cover 8b. The working skin 9 is removed at this stage, or else, when it consists of or comprises the hoods 9a, 9b, the latter are brought to the open position.

That makes it possible to vertically bring the turbojet engine 10 into the structural cover 8b, by introducing it through the opening 90. Next, an axial adjustment is, if necessary, possible between these two elements 8b, 10. When the turbojet engine 10 reaches its desired position relative to the device 4, the attachments are assembled. This position is represented in FIG. 9b. Next, the angular segment 88 is remounted as schematically represented in FIG. 9c, then the hoods 9a, 9b are closed, as shown in FIGS. 9d and 9e.

Figure 10A:
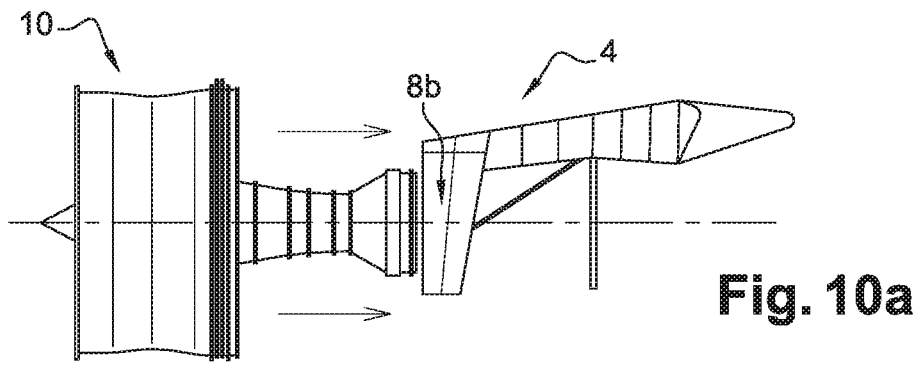
FIGS. 10a through 10c are side plane schematic views representing a second way of assembling the engine on the attachment device.
Figure 10B:
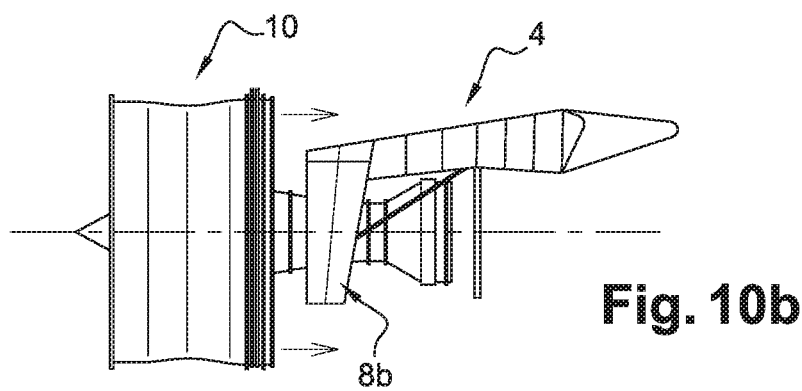
Figure 10C:
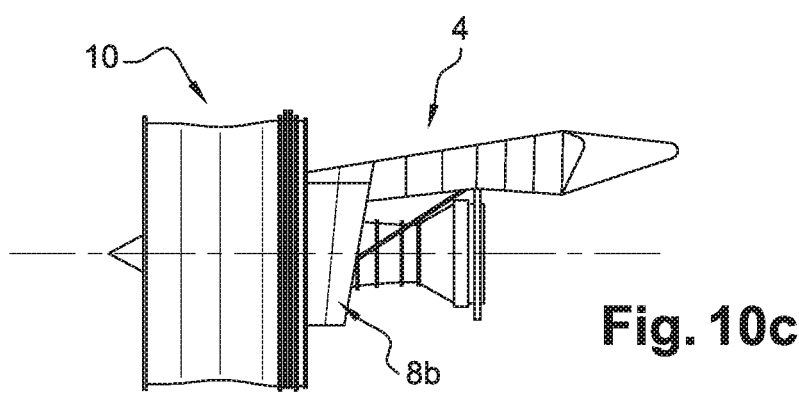

According to a second assembly technique shown in FIGS. 10a through 10c, the turbojet engine 10 is introduced axially into the structural cover 8b of the attachment device 4, with the cover 8b stripped of its outer skin. When the turbojet engine reaches its desired position relative to the device 4, the attachments are assembled, then the outer skin 9 is mounted.

Obviously, various modifications can be made by a person skilled in the art to the disclosure herein which has just been described, purely as nonlimiting examples.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
  a double-flow engine comprising an intermediate casing, the intermediate casing comprising:
    a hub;
    an outer shell; and
    radial arms linking the hub to the outer shell;
  an attachment device for attaching an engine to a structure of the aircraft, the attachment device comprising a primary structure equipped with a central box section;
  an attachment for attaching the engine to the primary structure of the attachment device; and
  a structural cover of the primary structure surrounding the engine and connected to the central box section;
  wherein the structural cover has an overall annular form centered on a longitudinal axis of the engine, and the structural cover comprises:
    an outer skin internally delimiting a secondary annular channel of the engine; and
    two thrust load take-up cradles arranged symmetrically relative to a median vertical plane of the engine assembly,
  wherein the attachment comprises:
    a group of main mounts; and a group of secondary mounts arranged at a rear of the group of main mounts, wherein the group of main mounts comprises a plurality of bolts distributed around the longitudinal axis of the engine and configured to fasten a front end of the structural cover to the hub of the intermediate casing, and wherein the group of secondary mounts comprises a plurality of secondary mounts distributed around the longitudinal axis of the engine and configured to fasten a rear part of the engine to a rear end of the structural cover.

2. The engine assembly of claim 1, wherein
the structural cover comprises a substantially annular front frame, forming the front end of the structural cover and substantially centered on the longitudinal axis of the engine, and
the substantially annular front frame is fastened to a front end of the central box section of the primary structure.

3. The engine assembly of claim 2, wherein
the structural cover comprises one or more other additional substantially annular frame, of which two facing ends are fastened respectively on either side of the central box section of the primary structure, and
the front frame and the one or more additional frame/ frames being are arranged in parallel in hypothetical transverse planes of the engine.

4. The engine assembly of claim 3, wherein each thrust load take-up cradle has a front end fastened to a rearmost additional frame, and a rear end fastened to the central box section of the primary structure.

5. The engine assembly of claim 4, comprising a plurality of pins arranged between the front end of the structural cover and the hub of the intermediate casing, wherein the pins are configured to correctly position the engine with respect to the primary structure and to take up shear and torque loads.

6. The engine assembly of claim 4,
wherein the structural cover comprises a substantially annular rear frame, forming the rear end of the structural cover and substantially centered on the longitudinal axis of the engine, the substantially annular rear frame being fastened to the central box section of the primary structure, forward relative to a rear end of the central box section, and
wherein the substantially annular rear frame is situated rearward relative to the rear ends of the thrust load take-up cradles.

7. The engine assembly of claim 3,
wherein the structural cover comprises a substantially annular rear frame, forming the rear end of the structural cover and substantially centered on the longitudinal axis of the engine, the substantially annular rear frame being fastened to the central box section of the primary structure, forward relative to a rear end of the central box section, and wherein the outer skin of the structural cover covers the substantially annular front frame, the one or more additional frame, and the substantially annular rear frame.

8. The engine assembly of claim 7, wherein the outer skin has a substantially annular form and is fixed to each of the substantially annular front frame, the one or more additional frame, and the substantially annular rear frame.

9. The engine assembly of claim 7, wherein the outer skin has two facing ends fastened respectively on either side of the central box section of the primary structure.

10. The engine assembly of claim 7, wherein
the outer skin takes the form of two mobile hoods each articulated on the central box section of the primary structure, each mobile hood having a front end cooperating with the front frame so as to form therewith, in a closed position of the hood, a mechanical link comprising a protuberance of trapezoidal section and a groove of complementary form receiving the protuberance, and
each mobile hood also has a rear end cooperating with the rear frame so as to form therewith, in the closed position of the hood, a mechanical link comprising a protuberance of trapezoidal section and a groove of complementary form receiving the protuberance.

11. The engine assembly of claim 10, wherein
the plurality of secondary mounts are each produced using a connecting rod articulated on a fitting of the structural cover and articulated on a fitting of the engine, and
the connecting rods are arranged substantially tangentially to the engine.

12. The engine assembly of claim 11, wherein the connecting rods forming the plurality of secondary mounts are arranged in a same hypothetical transverse plane of the engine.

13. The engine assembly of claim 3, wherein the front frame and the one or more additional frame are fixedly linked together by longitudinal reinforcements distributed around the longitudinal axis of the engine.

14. The engine assembly of claim 1, wherein the structural cover comprises a substantially annular rear frame, forming the rear end of the structural cover and substantially centered on the longitudinal axis of the engine, the substantially annular rear frame being fastened to the central box section of the primary structure, forward relative to a rear end of the central box section.

15. The engine assembly of claim 14, wherein the substantially annular rear frame is fastened to a bottom longeron of the central box section of the primary structure.

16. An aircraft comprising at least one engine assembly as claimed in claim 1, fastened under a wing of the aircraft.

* * * * *